United States Patent Office 2,861,073
Patented Nov. 18, 1958

2,861,073

VAT DYESTUFFS

Wilhelm Eckert and Otto Fuchs, Frankfurt am Main, Germany, assignors to Farbwerke Hoechst Aktiengesellschaft vormals Meister Lucius & Brüning, Frankfurt am Main, Germany, a corporation of Germany No Drawing. Application December 26, 1956
Serial No. 630,457

Claims priority, application Germany January 4, 1956

5 Claims. (Cl. 260—272)

The present invention relates to valuable new vat dyestuffs, more particularly it relates to dyestuffs corresponding to the following general formula

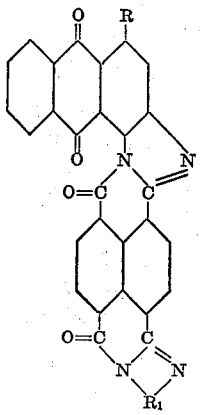

wherein R represents hydrogen, an alkoxy, a benzoylamino, chlorobenzoylamino or fluorobenzoylamino group, and $R_1$ represents a radical of the benzene series.

According to the process described in German Patent No. 517,195 vat dyestuffs of an asymmetrical structure are obtained by condensing naphthoylene-aryl- (or alkylaryl-) imidazole-peri-dicarboxylic acids or the anhydrides thereof with ortho-diamines. These vat dyestuffs are very suitable for dyeing and printing cotton, staple fibers of regenerated cellulose and viscose rayon. They have the following constitution:

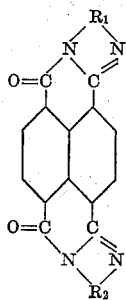

wherein $R_1$ and $R_2$ represent substituted or unsubstituted aryl radicals which are different from each other. Insofar as mixtures of isomeric compounds are present, they can be separated from each other, for example, by the processes described in German Patent No. 536,911 or its Patents of Addition Nos. 538,314, 567,210, 576,132 and 607,945.

All these dyestuffs have a pronounced affinity for vegetable fibers, furthermore, a good fastness to washing and to chlorine and a very good fastness to light, but their fastness to boiling soda is in many cases insufficient. Moreover, it is not possible to convert these dyestuffs into their leuco sulfuric acid esters according to the numerous processes hitherto known.

The present invention provides new vat dyestuffs which meet high demands with regard to the fastness to boiling soda and which can be converted by various methods into their sulfuric acid esters through their leuco compounds; these vat dyestuffs can be obtained by condensing at higher temperatures naphthoylene-aryl- (or alkylaryl-) imidazole-peri-dicarboxylic acids or the anhydrides thereof with substituted or unsubstituted 1,2-diamino-anthraquinones in the presence of organic solvents or diluents or in an aqueous suspension. As 1,2-diamino-anthraquinones there can advantageously be used in the process of this invention compounds corresponding to the following general formula:

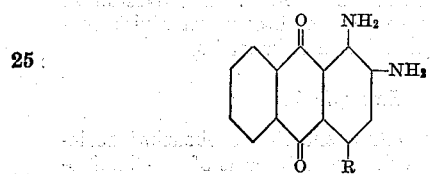

wherein R represents hydrogen, an alkoxy, a benzoylamino, chlorobenzoylamino or fluorobenzoylamino group.

The naphthoylene-aryl- (or alkylarlyl-) imidazole-peri-dicarboxylic acids or the anhydrides thereof can also be condensed with 1-nitro-2-amino- or 1-amino-2-nitro-anthraquinones and then treated at higher temperatures with reducing agents. By this treatment ring closure occurs with formation of imidazole derivatives. Furthermore, it is possible to condense naphthoylene-aryl- (or alkylaryl-) imidazole-peri-dicarboxylic acids or the anhydrides thereof with 1,2-diaminoanthraquinones in a solvent or diluent of low boiling point and to convert the intermediate products so obtained into the naphthoylene-aryl- (or alkylaryl-) imidazoles by heating to higher temperatures.

The new dyestuffs are distinguished by a great colouring strength.

The following examples serve to illustrate the invention, but they are not intended to limit it thereto, the parts being by weight, unless otherwise stated and the relationship of parts by weight to parts by volume being the same as that of the kilogram to the liter.

*Example 1*

340 parts of naphthoylene-benzimidazole-peri-dicarboxylic anhydride and 250 parts of 1,2-diaminoanthraquinone are heated for about 15 hours at 210° C. with 3000 parts of trichlorobenzene. After cooling to 150° C., the reaction product is filtered off with suction and the residue is washed with 2000 parts of hot trichlorobenzene. The adhering solvent is removed with methanol or ethanol and the press cake is dried. In this manner a deep dark-brown, crystalline pigment is obtained with a very good yield; it dyes cotton from a red-brown vat a clear copper shade. The dyestuff has a very good fastness to washing, to chlorine, to boiling soda and to light. It corresponds to the following formula

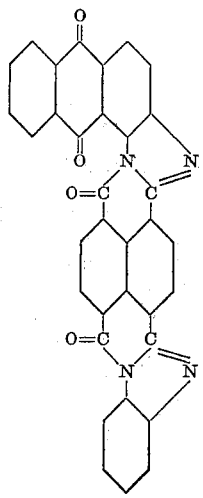

Example 2

38 parts of naphthoylene-benzimidazole-peri-dicarboxylic anhydride and 40 parts of 1,2-diamino-4-benzoylaminoanthraquinone are heated at the boil for 15 hours in 380 parts of trichlorobenzene. The reaction product is worked up as described in Example 1. The dyestuff so obtained dyes cotton from a red-brown vat bluish red-brown tints of very good fastness properties.

Example 3

374 parts of naphthoylene-4'-chlorobenzimidazole-peri-dicarboxylic anhydride and 250 parts of 1,2-diaminoanthraquinone are boiled under reflux for 10 hours with 3000 parts of quinoline. The dyestuff obtained is filtered off with suction while hot, the press cake is washed with hot quinoline and after cooling with methanol. The dark brown crystal powder so obtained dyes cotton from a red-brown vat copper tints.

Example 4

20 parts of naphthoylene-4'-ethoxy-benzimidazole-peridicarboxylic anhydride and 10 parts of 1,2-diaminoanthraquinone are heated under reflux for 6 hours with 150 parts of quinoline. The reaction product is worked up as described in Example 3. The dyestuff is obtained with a good yield. It dyes cotton from a red-brown vat deep dark-brown tints.

Example 5

20 parts of the dyestuff described in Example 4 and 15 parts of copper powder are introduced at 35° C. into an esterification mixture prepared at 20–25° C. from 200 parts of α-picoline and 40 parts of chlorosulfonic acid. The mixture is stirred for one hour at 45° C. and the resulting dark mass is then added to a mixture of 500 parts of water, 500 parts of ice and 10 parts of kieselguhr. The dark precipitate is filtered off with suction, washed with cold water and introduced into a solution of 40 parts of caustic soda in 1000 parts of water. The α-picoline is removed by distillation under reduced pressure and the solution of the ester is clarified by filtration. The clear brown solution of the leuco sulfuric acid ester is salted out with sodium chloride. The ester, which has been dried and stabilized by the addition of soda, dyes cotton, viscose rayon and staple fibers of regenerated cellulose by the known dyeing processes dark brown tints which correspond to the original dyestuff and exhibit the same very good fastness properties.

Example 6

100 parts of naphthoylene-benzimidazole-peri-dicarboxylic anhydride are heated at the boil for 20 hours with 115 parts of 1,2-diamino-4-(4'-chlorobenzoylamino)-anthraquinone in 1000 parts by volume of trichlorobenzene while continuously distilling off the reaction water. The condensation product is worked up as described in Example 1. The dyestuff so obtained dyes cotton from a brown vat full red-brown tints of very good fastness properties.

Example 7

50 parts of naphthoylene-benzimidazole-peri-dicarboxylic anhydride and 65 parts of 1,2-diamino-4-(2'-fluorobenzoylamino)-anthraquinone are heated at the boil for 20 hours in 1000 parts by volume of α-chloronaphthalene. The condensation product is worked up as described in Example 1. A red-brown pigment is obtained which dyes cotton from a brown vat full bluish red-brown tints of very good fastness properties.

We claim:

1. The vat dyestuffs corresponding to the following general formula

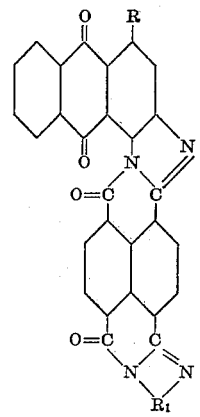

wherein R represents a member selected from the group consisting of hydrogen, benzoylamino, 4-chlorobenzoylamino and 2-fluorobenzoylamino, and $R_1$ represents a member selected from the group consisting of phenylene, chlorophenylene and ethoxyphenylene.

2. The vat dyestuff corresponding to the following formula

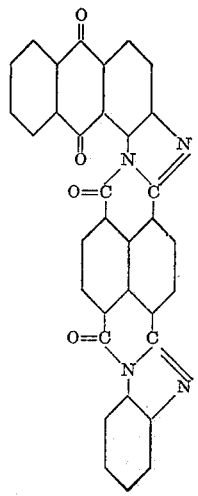

3. The vat dyestuff corresponding to the following formula
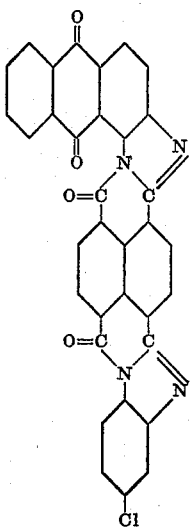
4. The vat dyestuff corresponding to the following formula
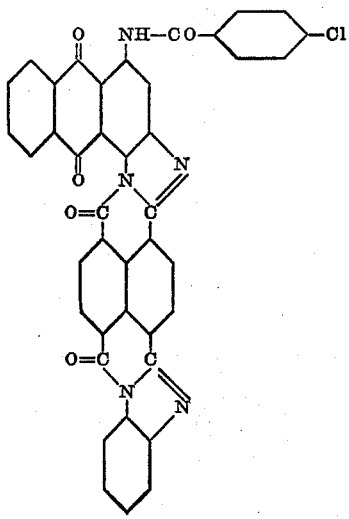
5. The vat dyestuff corresponding to the following formula
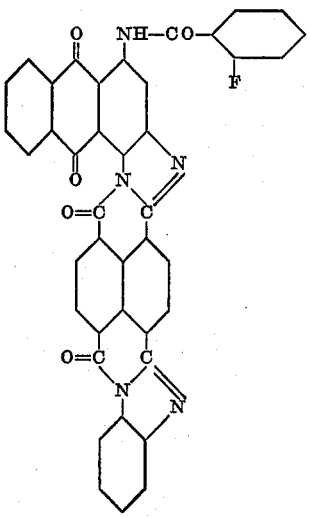
References Cited in the file of this patent
UNITED STATES PATENTS
2,026,026    Eckert et al.  --------------- Dec. 31, 1935